3,799,885
TEST SYSTEM FOR MONITORING HEPARIN
Lewis Hilliard Dennis, Silver Spring, and Woodrow James Reno, Glen Burnie, Md., assignors to Becton, Dickinson and Company, East Rutherford, N.J.
No Drawing. Filed Aug. 21, 1972, Ser. No. 282,581
Int. Cl. G01n 33/16
U.S. Cl. 252—408                2 Claims

ABSTRACT OF THE DISCLOSURE

A test system employing a novel buffered calcium chloride reagent adapted for use in monitoring heparin therapy is disclosed. The buffered test reagent is a pH stable calcium chloride solution having an activator admixed therewith. The novel buffer employed is n-2-hydroxy ethyl piperazine-n'-2-ethane sulfonic acid.

BACKGROUND OF THE INVENTION

Commercial diagnostic reagents are available which are employed in test procedures for monitoring heparin therapy. Such a procedure, for example, the Lee-White procedure has many variables and may require long time periods to obtain the test results. The problem with many of the commercial reagents which employ buffered calcium chloride solution with or without an activator is the maintenance of a constant pH during the test procedure. If the pH varies, the results obtained will vary even when conducting tests for heparin therapy on the same patient's blood.

SUMMARY OF THE INVENTION

With the foregoing in mind it is an object of our invention to provide a rapid, reproducible, non-variable test system for monitoring heparin therapy in blood. It is also an object of the invention to provide a novel buffer for use with the calcium chloride test reagent which is especially adapted for use in monitoring heparin therapy. The novel buffered calcium chloride reagent is pH stable and when employed for hematological tests does not result in variations, for example, in heparin levels even when duplicate tests are conducted on the same patient's blood. It is also an object of the invention to provide a novel buffer for a calcium chloride test reagent adapted for use in determining blood factors II, V, VIII, IX, X, XI, XII, and platelets in addition to monitoring heparin therapy.

Our invention generally contemplates providing a buffered calcium chloride solution which is pH stable, non-variable test reagent for determining various blood factors including the monitoring of heparin therapy. The novel buffer employed is n-2-hydroxyethyl piperazine-n'-2-ethane sulfonic acid, hereinafter referred to as HEPES. When the test reagent is buffered with HEPES, the reagent is found to be pH stable. Also the reagent may be used in a test procedure in which results obtained are rapid, reproducible, non-variable and can replace the Lee-White clotting time procedure as a means for monitoring heparin. The novel reagent may be employed either in a system designed for automatic determination of clotting time or in manual procedures.

DESCRIPTION OF THE PREFERRED EMBODIMENT

HEPES buffered calcium chloride reagent is prepared by dissolving calcium chloride in distilled water to form a .025 molar solution. An activator such as activated diatomaceous earth sold under the trade name Celite or kaolin, a white clay, is added to the calcium chloride solution 0.5–1% on a wgt./wgt. relation. HEPES is added to the calcium chloride solution in sufficient amount so as to provide a pH of 7.2 in the final solution.

The reagent as prepared above is placed in a constant temperature bath at 37° C. or in a constant temperature incubator or oven maintained at 37° C. A whole blood sample is obtained generally by a venipuncture and a specimen is collected in a blood collecting tube of the type generally sold under the trade name Vacutainer. The blood collecting tube may include therein a sufficient amount of sodium citrate, sodium oxylate or sodium heparin to prevent the bolod sample from clotting, or a sample may be drawn in the traditional means of employing a needle and immediately transferring blood contents of the syringe to a receptacle containing an anti-coagulant. The whole blood is then maintained at a temperature of 37° C. The buffered reagent, containing the novel buffering component HEPES, is thoroughly mixed either by mechanical agitation or by inversion to ensure a homogeneous suspension and equal volume (i.e. 0.2 milliliters) thereof is transferred to test tubes or reaction receptacles. Then, an equal amount of whole blood, i.e. 0.2 ml. is transferred to the test tube or reaction receptacle. A timer is immediately started at the time the whole blood is added to the buffered reagent. When a fibrin clot is formed the reaction is completed and the timer is stopped.

The procedure disclosed above has been found to be more reliable than similar procedures employing standard types of buffered calcium chloride. When monitoring heparin therapy, a test should be performed prior to initiating heparin therapy in order to establish the patient's normal pre-therapeutic baseline.

In the following example illustrating the procedure followed for monitoring heparin, the novel buffered calcium chloride solution containing HEPES is employed. An apparatus such as is sold under the trade name Fibrometer is employed to carry out the test which detects the time it takes a fibrin thread to form in a blood sample. The HEPES buffered reagent, as described above, is generally provided in aqueous form in 5 ml. vials or containers and is stable for at least one year when stored at room temperature. A .4 ml. probe is employed with the Fibrometer, 0.2 ml. of the reagent is measured into a cup or tube and is maintained at 37° C. Then, an equal amount of whole blood, 0.2 ml., is measured into the tube or cup and is also maintained at 37° C. The whole blood is prevented from clotting by using a suitable anti-coagulant i.e. sodium oxlate or citrate. When the blood is measured into the cup a timer is started. The time lapse from the addition of the blood sample to the end point, i.e. formation of the fibrin clot ranges generally betwen 45 and 85 seconds.

The above test provides optimum results. Also, comparative results within the precision of the method are obtained using the manual tube method. Since the test utilizes whole blood it can be performed at bedside or in the doctor's office or laboratory.

The above test using the HEPES regeant may also be employed to measure factors II, V, VIII, IX, X, XI, XII and platelets. It is therefore the equivalent to the Lee-White clotting time as a screening test for coagulation defects. Also, the reagent has application as a means for screening hyper and hypo-coagulability and test time will be prolonged in platelet function abnormality.

From the foregoing, a new and useful buffered reagent is employed to test and analyze blood and is particularly useful for monitoring heparin therapy.

We claim:
1. A buffered reagent adapted for use in monitoring heparin therapy consisting essentially of: an aqueous solution of calcium chloride having added thereto n-2 hydroxy ethyl piperazine-n'-2-ethane sulfonic acid in sufficient amount to provide a pH of about 7.2 of calcium chloride solution; said buffered calcium chloride solution including a material selected from the group consisting of activated diatomaceous earth and kaolin said material being in the proportion from about 0.5% to 1% on a wgt./wgt. relation so that a pH stable buffer solution is obtained for extended periods of time.
2. A buffered reagent adapted for use in monitoring heparin therapy as set forth in claim 1 wherein the calcium chloride solution is .025 molar.

References Cited

UNITED STATES PATENTS 3,395,210    7/1968    Lenahan _____ 23—230 B

LEON D. ROSDOL, Primary Examiner

J. WARE, Assistant Examiner

U.S. Cl. X.R.

23—230 B; 424—2